United States Patent
Sharkh et al.

(10) Patent No.: US 10,458,502 B2
(45) Date of Patent: Oct. 29, 2019

(54) RELATING TO ELECTROMECHANICAL ACTUATORS

(71) Applicant: BAE SYSTEMS plc, London (GB)

(72) Inventors: Suleiman Mahmoud Sharkh, Highfield (GB); Stephen Daley, Highfield (GB); Hui Huang, Highfield (GB)

(73) Assignee: BAE SYSTEMS plc, London (GB)

( * ) Notice: Subject to any disclaimer, the term of this patent is extended or adjusted under 35 U.S.C. 154(b) by 42 days.

(21) Appl. No.: 15/541,443

(22) PCT Filed: Jan. 5, 2016

(86) PCT No.: PCT/GB2016/050007
§ 371 (c)(1),
(2) Date: Jul. 3, 2017

(87) PCT Pub. No.: WO2016/110683
PCT Pub. Date: Jul. 14, 2016

(65) Prior Publication Data
US 2018/0238411 A1 Aug. 23, 2018

(30) Foreign Application Priority Data

Jan. 7, 2015 (EP) .................................... 15150348
Jan. 7, 2015 (GB) .................................. 1500201.7

(51) Int. Cl.
*H01F 5/00* (2006.01)
*F16F 7/10* (2006.01)
(Continued)

(52) U.S. Cl.
CPC ............ *F16F 7/1011* (2013.01); *F16F 7/104* (2013.01); *H02K 33/06* (2013.01);
(Continued)

(58) Field of Classification Search
CPC ...... F16F 7/1011; F16F 7/104; F16F 2230/18; F16F 2238/026; H02K 33/06; H02K 2201/18; H02K 2228/007
(Continued)

(56) References Cited

U.S. PATENT DOCUMENTS 2,695,165 A * 11/1954 Hansen ................. G01P 15/132
250/214 R
2,715,528 A * 8/1955 Caldwell ............... G05D 13/00
200/80 R
(Continued)

FOREIGN PATENT DOCUMENTS

GB 2316732 A 3/1998
JP 09-177881 A 7/1997
(Continued)

OTHER PUBLICATIONS

International Search Report and Written Opinion for Patent Application No. PCT/GB2016/050007, dated May 2, 2016. 11 pages.
(Continued)

*Primary Examiner* — Shawki S Ismail
*Assistant Examiner* — Lisa N Homza
(74) *Attorney, Agent, or Firm* — Finch & Maloney PLLC

(57) ABSTRACT

The present invention concerns electromechanical actuators. More particularly, but not exclusively, this invention concerns actuators operable in multiple degrees of freedom. There is provided an actuator comprising a proof-mass and at least two coils arranged such that current flowing through the coil produces a force that acts on the proof-mass, the proof-mass being mounted for movement in at least two degrees of freedom, wherein one of the at least two degrees of freedom is a translational degree of freedom.

18 Claims, 5 Drawing Sheets

(51) Int. Cl.
*F16F 7/104* (2006.01)
*H02K 33/06* (2006.01)

(52) U.S. Cl.
CPC ..... *F16F 2222/08* (2013.01); *F16F 2228/007* (2013.01); *F16F 2230/18* (2013.01); *F16F 2238/026* (2013.01); *H02K 2201/18* (2013.01)

(58) Field of Classification Search
USPC ........................................................ 335/266
See application file for complete search history.

(56) References Cited

U.S. PATENT DOCUMENTS

| | | | | |
|---|---|---|---|---|
| 3,213,331 | A * | 10/1965 | Schneider | H03D 3/16 331/154 |
| 3,337,826 | A * | 8/1967 | Lehmann | H01H 50/76 335/90 |
| 3,395,349 | A * | 7/1968 | Bajars | G01R 5/08 324/150 |
| 3,745,495 | A * | 7/1973 | Chai | B41J 9/38 101/93.29 |
| 3,970,979 | A * | 7/1976 | Montagu | G01P 3/487 335/229 |
| 4,329,672 | A * | 5/1982 | Stahl | H01F 7/14 310/36 |
| 4,874,998 | A * | 10/1989 | Hollis, Jr. | B23Q 5/28 318/568.21 |
| 4,922,159 | A * | 5/1990 | Phillips | B64G 1/22 244/164 |
| 5,146,566 | A * | 9/1992 | Hollis, Jr. | G06F 3/0362 335/220 |
| 5,157,296 | A * | 10/1992 | Trumper | B82Y 15/00 310/181 |
| 5,333,819 | A | 8/1994 | Stetson, Jr. | |
| 5,877,569 | A * | 3/1999 | Heinrich | H02K 23/66 310/67 R |
| 5,920,173 | A | 7/1999 | Mercadal et al. | |
| 6,064,129 | A | 5/2000 | Pompei | |
| 6,066,998 | A * | 5/2000 | Trumper | H01F 7/066 310/13 |
| 6,850,138 | B1 * | 2/2005 | Sakai | H04R 9/025 335/222 |
| 7,026,900 | B1 * | 4/2006 | Gregory | H02K 99/20 310/15 |
| 7,034,415 | B2 * | 4/2006 | Turner | G02B 26/085 310/36 |
| 7,124,720 | B2 * | 10/2006 | Liang | F01L 9/04 123/90.11 |
| 7,222,554 | B2 * | 5/2007 | Hayashi | F16H 61/32 335/266 |
| 7,249,579 | B2 * | 7/2007 | Liang | F01L 9/04 123/90.11 |
| 8,188,622 | B1 * | 5/2012 | Waters | H02K 35/04 290/1 R |
| 8,714,324 | B2 | 5/2014 | Shimoda et al. | |
| 2015/0219176 | A1 | 8/2015 | Choy et al. | |

FOREIGN PATENT DOCUMENTS

| | | |
|---|---|---|
| JP | 2000-234646 A | 8/2000 |
| JP | 2003/048143 A | 2/2003 |
| JP | 2009-038881 A | 2/2009 |
| KR | 101385600 B1 | 4/2014 |
| KR | 101427335 B1 | 8/2014 |
| WO | 9313586 | 7/1993 |
| WO | 2016110683 A1 | 7/2016 |

OTHER PUBLICATIONS

GB Intellectual Property Office Search Report under Section 17(5) for GB Patent Application No. 1500201.7, dated Jul. 6, 2015. 3 pages.
Extended European Search Report issued for EP Patent Application No. 15150348.9, dated Jul. 29, 2015. 8 pages.
Translation of JP Office Action for JP Application No. 2017-536244, dated Jul. 24, 2018. 5 pages.
International Preliminary Report on Patentability for Patent Application No. PCT/GB2016/050007, dated Jul. 20, 2017. 8 pages.

* cited by examiner

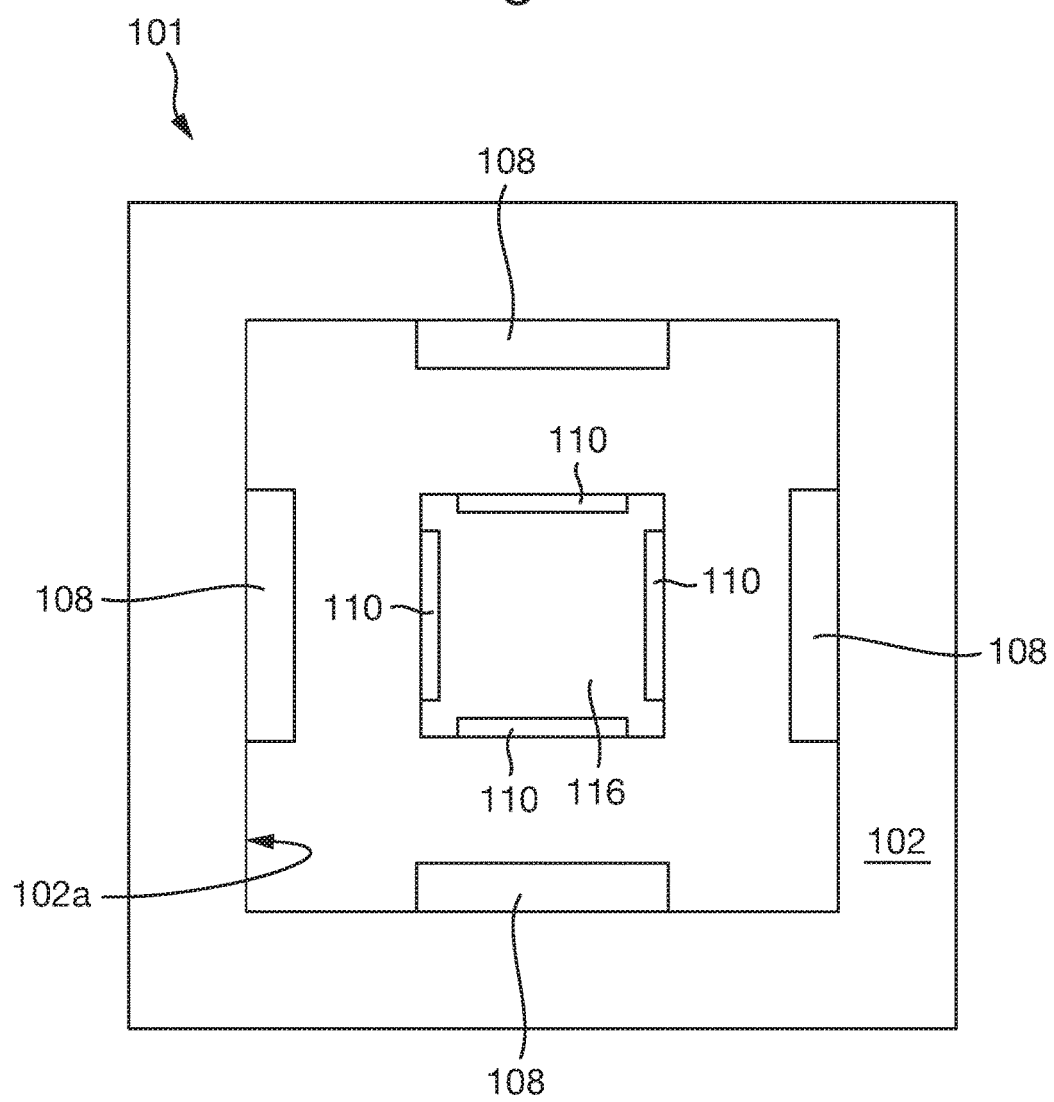

RELATING TO ELECTROMECHANICAL ACTUATORS

FIELD OF THE INVENTION

The present invention concerns electromechanical actuators. More particularly, but not exclusively, this invention concerns actuators operable in multiple degrees of freedom. The invention also concerns a structure including such an actuator and methods of damping vibration in a structure using such an actuator.

BACKGROUND OF THE INVENTION

Electromechanical actuators are used in a wide variety of applications to produce motion in response to an electric current.

In many situations where actuators are employed, for example in aerospace or marine applications, space is limited. It would therefore be advantageous to provide a more compact actuator.

In general, the utility of a particular actuator in a given scenario will be determined by its force density, that is to say the amount of force the actuator can generate in proportion to its mass. It would therefore be advantageous to provide an actuator with an increased force density.

Many applications in which actuators are used require the generation of motion in more than one degree of freedom. Typically, in order to produce multiple degree of freedom motion, a plurality of single degree of freedom actuators are used, with each individual actuator providing movement in its own respective degree of freedom. Actuator systems which are designed in this manner are relatively bulky. Moreover, the complexity (both mechanically and in terms of control) of the system may also increase manufacturing cost and/or reduce reliability.

One particular application of actuators is in active vibration control, where an actuator may be used to exert a force on a structure in order to reduce vibration of the structure. The force may be generated by moving a proof-mass. Vibrational motion may occur in multiple degrees of freedom, and may involve movement in all six degrees of freedom. It is therefore desirable to have actuator systems capable of producing multiple degrees of freedom force to reduce the effects of such vibration. Typically this has required multiple actuators (as discussed above) and multiple proof-masses, with each actuator moving its respective proof-mass. Active vibration systems designed in this manner are generally bulky and have relatively low force density.

The present invention seeks to mitigate the above-mentioned problems. Alternatively or additionally, the present invention seeks to provide an improved actuator, particularly an improved actuator for use in active vibration control.

SUMMARY OF THE INVENTION

The present invention provides, according to a first aspect, an actuator comprising a proof-mass and at least two coils arranged such that current flowing through the coils produces a force that acts on the proof-mass, the proof-mass being mounted for movement in at least two degrees of freedom, wherein one of the at least two degrees of freedom is a translational degree of freedom. Energising the coils may cause the proof-mass to move in any combination of the at least two degrees of freedom. Thus, the actuator may provide multiple degree of freedom motion. Having a single proof-mass that can move in more than one degree of freedom facilitates the design of actuators which are more compact than prior-art designs. It will be understood that the motion of the proof-mass produced by the current flowing through the coils will depend on which of the at least two coils are energised, the direction of the flow of current through the coils and their location relative to the proof-mass.

It will be appreciated that "degree of freedom" as used herein refers to the six independent parameters which can be used to describe a movement of a body from a first position to a second position in three-dimensional space. Thus a degree of freedom may be one of three translational movements (X, Y, Z) or one of three rotational movements (p, q, r or $R_x$, $R_y$, $R_z$).

As discussed above, the proof-mass is mounted for movement in at least two degrees of freedom, wherein one of the at least two degrees of freedom is a translational degree of freedom. It may be that another of the at least two degrees of freedom is a rotational degree of freedom. It may be that another of the at least two degrees of freedom is a second translational degree of freedom.

It may be that the proof-mass is mounted for movement relative to the coils. Alternatively, it may be that each coil is mounted for movement with the proof-mass. For example, each coil may be rigidly connected to the proof-mass. It may be that the proof-mass is made from ferromagnetic material, for example steel. It may be that the proof-mass has a mass of between 2 and 10 kg, for example between 3 and 6 kg, for example between 4 and 5 kg. It may be that the actuator comprises a single proof-mass.

It may be that the actuator includes at least two magnets. For example, it may be that the actuator includes at least two electromagnets. It may be that each electromagnet comprises one of the at least two coils wound around a ferromagnetic core. It may be that each electromagnet comprises a plurality of the coils. It may be that the actuator includes at least two permanent magnets, for example four permanent magnets.

It may be that the actuator includes at least four permanent magnets arranged as two permanent magnet pole pairs.

It may be that the actuator includes orthogonal coils arranged to provide independent control of magnetic forces tangential and normal to the surface of the proof mass.

It may be that the actuator includes no permanent magnets. The actuator may then rely on reluctance force to control the proof mass.

It may be that the actuator includes at least two permanent magnet pole pairs, each coil being associated with a corresponding pole pair such that current flowing through the coil interacts with the magnetic field of the pole pairs to produce a force that acts on the proof-mass. Thus, the force which acts on the proof-mass may be a force, for example a Lorentz force, generated by a current flowing through the coils in the presence of the magnetic-field of the permanent magnets. It will be appreciated that any motive force produced by the interaction of the current in the coil and the magnetic field of the pole pairs will act on both the coil and the pole pairs. It will be appreciated that where the force is generated by a current flowing in the presence of a magnetic field, the force generated will be orthogonal to both the direction of the magnetic field and the current. For example, where the pole pair is substantially planar, the force generated will be parallel to the surface of the pole pair.

It may be that the pole pairs are mounted for movement with, for example are rigidly connected to, the proof-mass. It may be that the pole pairs are mounted for movement with the proof-mass and the proof-mass is mounted for movement relative to the coils. Thus, it may be that each coil is associated with a corresponding pole pair such that current flowing through the coil interacts with the magnetic field of the pole pair to produce a force that acts on the proof-mass via the pole pair.

It may be that each coil is mounted for movement with, for example is rigidly connected to, the proof-mass. It may be that each coil is mounted for movement with the proof-mass and the proof-mass is mounted for movement relative to the pole pairs. Thus, it may be that each coil is associated with a corresponding pole pair such that current flowing through the coil interacts with the magnetic field of the pole pair to produce a force that acts on the proof-mass via the coil.

In some embodiments, it may be that each coil forms part of an electromagnet. Thus, it may be that the actuator comprises at least two electromagnets. It may be that each coil is formed around a ferromagnetic core such that a magnetic field is generated when current flows through the coil. It may be that the proof-mass comprises a ferromagnetic material. Thus, the force which acts on the proof-mass may be a magnetic attractive force between an electromagnet formed at least in part by one of the at least two coils and a ferromagnetic material, for example a ferromagnetic proof-mass. It may be that the ferromagnetic core is a ferromagnetic rod, for example a steel rod. It may be that the proof-mass is mounted for movement relative to the rod. It may be that the proof-mass is the ferromagnetic core of the electromagnet and the actuator includes a further body made from ferromagnetic material. It may be that the proof mass includes a toothed structure on its surface. The proof mass can then form part of switched reluctance motor.

It may be that the actuator employs both reluctance and permanent magnet forces to control the proof mass.

Where the actuator includes two coils and two corresponding pole pairs translational motion may be generated by energising two coils on opposite sides of the proof-mass. Rotational motion may be generated by energising a single coil. Additionally or alternatively, rotational motion may be generated by energising two coils on opposite sides of the proof-mass with current flowing in opposite directions. Thus, a two coil actuator may provide motion in both a rotational and a translational degree of freedom. It will be understood that an actuator with more than two coils may provide motion in more than two degrees of freedom. For example, three, four, five or six coils (and corresponding pole pairs) can generate motion in three, four, five or six degree of freedom respectively.

It may be that the actuator includes further coils, for example the actuator may comprise three, four, five, six or more coils. It may be that the actuator includes further pole pairs, for example the actuator may comprise three, four, five, six or more pole pairs. It may be that the actuator includes further electromagnets for example three, four, five, six or more electromagnets. It may be that each coil is associated with a magnet such that current flowing through the coil induces a force which acts on the proof-mass. For example, each coil may be associated with a pole pair such that current flowing through the coil in the presence of the magnetic field of the pole pair induces a force which acts on the proof-mass. A coil associated with a magnet may be located opposite that magnet.

It may be that the proof-mass is mounted for movement in further degrees of freedom, for example the proof-mass may be mounted for movement in three, four, five or six degrees of freedom.

It may be that the actuator comprises six permanent magnet pole pairs and six coils, each coil being associated with a pole pair such that current flowing through the coil interacts with the magnetic field of the pole pair to produce a force that acts on the proof-mass (for example, via the coils or via the pole pairs), the proof-mass being mounted for movement in six degrees of freedom. Thus, it may be that the actuator can provide movement of the proof-mass in all six degrees of freedom. Having a single proof-mass moveable in all six degrees of freedom may facilitate actuator designs which are more compact, and which may have a higher force density, than prior-art actuator designs.

It may be that each coil is arranged such that current flowing through the coil produces forces that act radially with respect to the proof-mass. For example, where a coil is associated with a planar face of the proof-mass, the coil may be arranged such that current flowing through the coil produces a force that acts in a direction normal to the planar face.

It may be that each coil is arranged such that current flowing through the coil produces forces that act tangentially with respect to a surface of the proof-mass. For example, where a coil is associated with a planar face of the proof-mass, the coil may be arranged such that current flowing through the coil produces a force that acts in a direction parallel to the planar face.

It may be that at least one of the at least two coils is arranged to produce a tangential force on a first region, for example a planar face, of the proof-mass and at least one of the at least two coils is arranged to produce a radial force on the same region, for example the same face, of the proof mass.

Thus, the at least two coils may be arranged such that they produce forces that act radially, tangentially or both radially and tangentially on the proof-mass.

It may be that each pole pair comprises two permanent magnets, for example two SmCo26 magnets. Each permanent magnet may have an outer face. It may be that the outer face has a polarity. For example, a permanent magnet may have an outer North-face or an outer South-face. It may be that each pole pair comprises a first magnet with an outer North-face and a second magnet with an outer South-face. It may be that the outer faces of the first and second magnets of a pole pair face in the same direction. Each permanent magnet may have an inner face, opposite the outer face. It may be that the magnet is attached to the actuator via the inner face.

In the case that the proof-mass is mounted for movement relative to the pole pair, it may be that the outer face of each magnet of the pole pair faces towards the proof-mass. In the case that each pole pair is attached to the proof-mass, it may be that the outer face of each magnet faces away from the proof-mass. In such a case, it may be that the inner face of each magnet faces towards the proof-mass.

It may be that the length and width of each permanent magnet is substantially greater than its thickness. It may be that each of the permanent magnets is substantially planar. It may be that the inner face of each magnet is attached to the proof-mass. It may that each magnet is attached to the proof-mass using an adhesive. It may be that each magnet extends over a portion of the surface of the proof-mass. It may be that the majority of the surface area of the proof-mass is covered by magnets. It may be that each pole pair is located on a different face of the proof-mass. It may be that each pole pair is located opposite a different face of the proof-mass. It may be that at least one face of the proof-mass is associated with more than one pole pair.

It may be that the proof-mass has at least two planar faces. It may be that the proof-mass has the same number of planar faces as the actuator has coils. It may be that each coil is associated with a planar face of the proof-mass. It may be that the proof-mass is substantially cuboidal. Advantageously, a cuboidal proof-mass may facilitate designs having, when the proof-mass is in a neutral position, an air gap of constant width between the coils and the corresponding pole pairs and/or the proof-mass without the need for complex machining. For example, a cuboidal proof-mass can be used with substantially planar pole pairs and coils. It will be understood that the proof-mass may have, for example, chamfered corners or edges and still be considered to be substantially cuboidal. It may be that a coil and a corresponding pole pair are associated with each face of the cuboidal proof-mass. Using a cuboidal proof-mass may facilitate efficient packing of the actuator and therefore reduce the size of the actuator. It may be that a pole pair is located on each face of the cuboidal proof-mass. It may be that a coil is located opposite each face of the cuboidal proof-mass.

It may be that the actuator includes a control system arranged to control the flow of current to each of the coils. It may be that the control system is arranged to provide a sinusoidally changing current. It may be that the control system is arranged to switch the current flowing to the coils on and off, to increase the flow of current and/or to change the direction of the flow of current. It may be that the control system includes one or more sensors, for example Hall Effect sensors, arranged to detect the position of the proof-mass. It may be that the one or more sensors are Hall Effect sensors. It may be that the one or more sensors senses the position of the proof-mass by measuring emf in the coils. It may be that one or more of the coils includes an open turn and the one or more sensors measure flux changes, and hence position of the proof mass, via the open turn(s). It may be that additional coils are provided to enable the detection of the position of the proof mass. It may be that the control system includes a feedback loop. Data from the sensors may be used to adjust the flow of current to each of the coils as part of a feedback system.

It may be that the actuator includes a frame. It may be that the proof-mass is mounted for movement relative to the frame. It may be that each coil is mounted for movement relative to the frame. Alternatively, each coil may be attached to the frame. It may be that each magnet, for example each pole pair, is mounted for movement relative to the frame. It may be that each magnet, for example each pole pair, is attached to the frame.

It may be that each coil is formed around a core, for example a steel structure. It may be that each coil comprises conducting wire, for example copper wire, wound around the core. It may be that the coil has a major diameter significantly larger than the minor diameter of the coil. That is to say, it may be that the coil is elliptical or oblong. It may be that the coil extends in a plane parallel to the outer face of the corresponding magnet. It may be that each core includes a slot. Each slot may extend parallel to the outer face of the corresponding magnet. It may be that each coil is formed around the core such that a portion of the coil is located in a slot. It may be that each core includes a pair of parallel slots. It may be that a first portion of the coil is located in one of a pair of slots and a second portion of the coil is located in the other of the pair of slots. It may be that the portion of the coil located in the or each slot appears square when viewed in cross-section. It may be that the core is made of a ferromagnetic material. Thus, in the case where the actuator includes permanent magnets, it may be that the permanent magnets are attracted to the slot structure. It may be that the actuator includes a suspension system arranged and configured to compensate for said attraction.

It may be that the actuator includes a suspension system biased to return the proof-mass to a central position. The central position may be defined as a position in which the proof-mass is equidistant with respect to the coils and/or the magnets of the actuator. For example, where the proof-mass is mounted for movement relative to coils, the central position may be defined as a position in which the proof-mass is equidistant with respect to the coils. It may be that the suspension comprises a plurality of permanent magnets arranged to bias the proof-mass towards the central position. Thus, the proof mass is provided with magnetic levitation support. It may be that the suspension comprises a plurality of resilient members, for example coil springs, arranged to bias the proof-mass towards the central position. It may be that each resilient member is connected to the proof-mass. It may be that each resilient member extends between the proof-mass and the frame. It may be that each resilient member is connected to the proof-mass in the region of a vertex of the proof-mass. It may be that the suspension includes eight resilient members, for example eight coil springs, one located at each vertex of a cuboidal proof-mass. It may be that some of the resilient members of the suspension system have different lengths and/or stiffness with respect to others of the resilient members, for example to compensate for the effects of gravity. It may be that a suspension sensor, for example a strain gauge or load cell, is attached to a resilient member of the suspension system. It may be that a suspension sensor is attached to each resilient member of the suspension system. It may be that each suspension sensor provides feedback to the control system.

It may be that the proof-mass is located within a volume defined by the coils. That is to say, it may be that the coils are located around the outside of the proof-mass. Locating the proof-mass within a volume defined by the coils may facilitate more compact actuator designs and/or actuator designs that are easier to assemble and/or maintain. It may be that the proof-mass is located within a volume defined by the pole pairs.

It may be that the proof-mass is located outside a volume defined by the coils. That is to say, it may be that the coils are located within a volume defined by the proof-mass, for example within a cavity formed in the proof-mass. Thus, an "inside-out" configuration may be provided.

It will be appreciated that is not necessary for the magnets and the coils to be located around the outside of the proof-mass. For example, it may be that a hollow proof-mass encloses the magnets and the coils. It may be that the pole pairs are located within a volume defined by the proof-mass, for example within a cavity formed in the proof mass. It may be that the proof-mass is hollow.

It may be that the actuator includes an air gap between each magnet and the corresponding coil. It may be that the width of the air gap is between 5 mm and 20 mm, for example between 7 mm and 15 mm, for example around 10 mm.

According to a second aspect there is provided a structure including an actuator in accordance with the first aspect.

It may be that the actuator is formed at least in part by the structure. For example components of the actuator may form a functional part of the structure. It may be that the structure is the proof-mass. It may be that the structure is the housing of a piece of equipment. It may be that the housing is the proof-mass. It may be that the coils and the pole pair (if present) are located within the housing.

It may be that actuator is formed separately from the structure. For example, it may be that the actuator is a separate unit connected to, for example bolted to, the structure. It may be that the frame of the actuator is connected to the structure. It may be that the proof-mass is mounted for movement relative to the structure.

According to a third aspect of the invention there is provided a method of damping vibration in a structure, using an actuator comprising a proof-mass and at least two coils, the method comprising the steps of: passing a current through two of the coils to produce translation of the proof-mass in a first degree of freedom; and passing a current through at least one of the coils to produce movement of the proof-mass in a second degree of freedom.

It may be that the method of damping vibration in the structure is a method of active vibration control. Damping may be defined as a reduction in the magnitude of vibration, particularly at a critical frequency. Thus, damping vibration may include reducing the maximum amplitude of vibration experienced in a given frequency range, for example the "normal" or "useful" frequency range.

It may be that the force generated by passing a current through at least one of the at least two coils moves the proof-mass from a first position to a second position. It may be that the movement from the first position to the second position comprises a translation of the proof-mass. It may be that the movement from the first position to the second position comprises a rotation of the proof-mass. Thus, it may be that the method comprises a step of passing a current through at least one of the coils to produce rotational movement of the proof-mass. It maybe that the movement from the first position to the second position comprises both a translation and a rotation of the proof-mass. Thus, it may be that the method comprises a step of passing current through the coils to simultaneously produce a rotation and a translation of the proof-mass.

It may be that the proof-mass is a part of the structure to be damped. Using the structure to be damped as the proof-mass may reduce the amount of space required to accommodate the actuator.

It may be that the actuator comprises at least two permanent magnet pole pairs, each pole pair being arranged such that a force is generated when current passes though the coil in the presence of the magnetic field of the pole pair. Thus, movement of the proof-mass may be produced by passing current through a coil in the presence of the magnetic field of a pole pair.

It may be that the proof-mass is separate from the structure to be damped. In some circumstances it may be advantageous to use an actuator formed as a separate unit from the structure to be damped. For example, separating the actuator from the structure to be damped may facilitate retro-fitting of the actuator.

It will be appreciated that features described in relation to one aspect of the present invention may be incorporated into other aspects of the present invention. For example, the method of the invention may incorporate any of the features described with reference to the apparatus of the invention and vice versa.

It will be appreciated that while the invention has been described above with reference to an actuator, the device herein described can, in any configurations, function as a generator. That is to say, the at least two coils may be arranged such that movement of the proof-mass induces a current in the coils. Thus, there may be provided a generator comprising a proof-mass mounted for movement in at least two degrees of freedom, wherein one of the at least two degrees of freedom is a translational degree of freedom, and at least two coils, and wherein the coils are arranged such that movement of the proof-mass induces a current in the at least two coils. It may be that the generator includes a magnet, for example a pair or permanent magnets or an electromagnet, both as described above. Providing a multiple degree of freedom generator may facilitate more efficient generation of electricity from systems which experience multiple degree of freedom movement such as wave energy harvesting devices. Generators in accordance with the present invention may incorporate features described above with reference to an actuator.

DESCRIPTION OF THE DRAWINGS

Embodiments of the present invention will now be described by way of example only with reference to the accompanying schematic drawings of which:

FIG. 4 shows a schematic cross-sectional view of an actuator according to a second embodiment of the invention.

DETAILED DESCRIPTION

Figure 1:
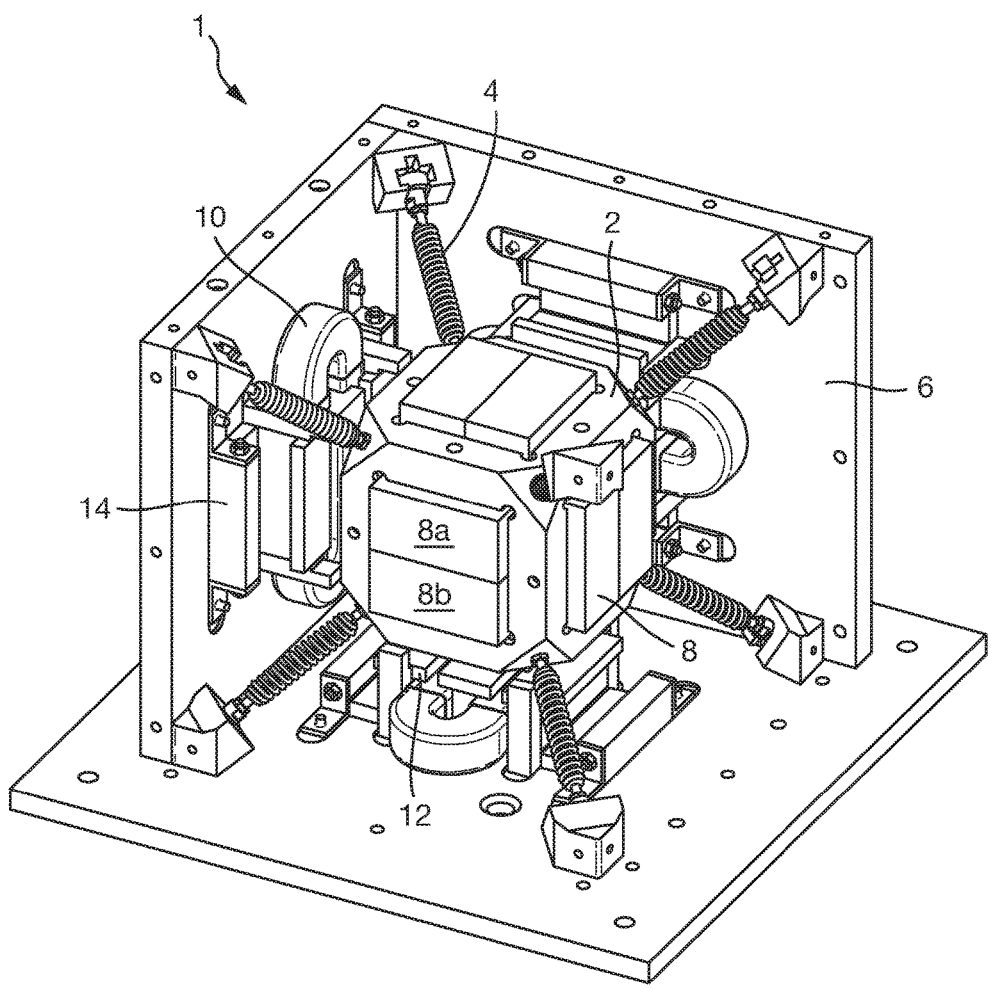
FIG. 1 shows a perspective view of an actuator according to a first embodiment of the invention.

FIG. 1 shows a cut-away perspective view of a first example actuator 1 in accordance with the present invention. In this example, the actuator 1 comprises a steel cube 2 weighing around 4.8 kg and attached by a spring 4 at each vertex to a cuboidal support frame 6 measuring around 168 mm along each side. Each spring 4 has a stiffness of 3.5 N/mm. To compensate for the effect of gravity and to place the steel cube 2 at the centre of the support frame 6, the top springs are shorter than the bottom springs. To enable the internal structure of the actuator to be seen the front, top and right-hand-side portions of support-frame 6 are not shown in FIG. 1. One of six substantially planar permanent magnet pole pairs 8 is centrally located on, and extends over, each face of the cube 2. Each pole-pair 8 comprises two substantially planar Samarium Colbalt (SmCo26) magnets; one planar magnet 8a is orientated with its South pole facing outwards from the surface of the cuboidal mass 2, the other planar magnet 8b is orientated with its north pole facing outwards from the surface of the cuboidal mass 2. Thus, the actuator 1 includes twelve magnets 8a, 8b in total. One of six oblong coils 10 is attached to the frame 6 opposite each face of the proof-mass 2 via a laminated steel structure 14. The gap between the face of each coil 10 and the outer face of the corresponding planar magnets 8a, 8b is around 10 mm. Each coil 10 is formed of four strand 24 AWG (American Wire Gauge) copper wire wound one hundred and ten times around the steel structure 14. Each steel structure 14 contains a pair of parallel slots 12 in which the two long sides of each elliptical coil 10 are located. The planar magnets 8a, 8b are rectangular when viewed in plan, and the long side of each magnet 8a, 8b lies parallel to the longitudinal axis of the corresponding elliptical coil 10. To enable the internal structure of the actuator to be seen the front, top and right-hand-side coils 10 and steel structure including slots 12 are not shown in FIG. 1. A control unit (not shown) controls the flow of current to each coil 10.

In use, when current flows through any one of the coils 10, the presence of the moving charge in the magnetic field of the corresponding pole-pair 8a, 8b generates a Lorentz force which acts on the pole-pair 8 and, via the pole-pair, the steel mass 2. (There is also a normal force that will attract the magnets to the steel core. This can be cancelled out if the opposing coils act in pairs, but it can also or alternatively be utilised as an additional force.) The force generated will be parallel to the face of the magnet 8. By controlling the flow of current through each of the six coils 10 the steel cube 2 can be moved in any one of six degrees of freedom. As the cube 2 moves in a given direction one or more of the magnets may be moved closer to the opposing steel slot 12 such that the attractive force between the magnet 8 and the steel structure 14 becomes significant. The springs 4 act to counteract this force and return the cube 2 to the central position when current no longer flows through any of the coils 10.

Thus, actuators in accordance with the present embodiment provide movement of the proof-mass in six degree of freedom. Actuators in accordance with the above embodiments also have a relatively compact design leading to an increased force density.

Figure 2:
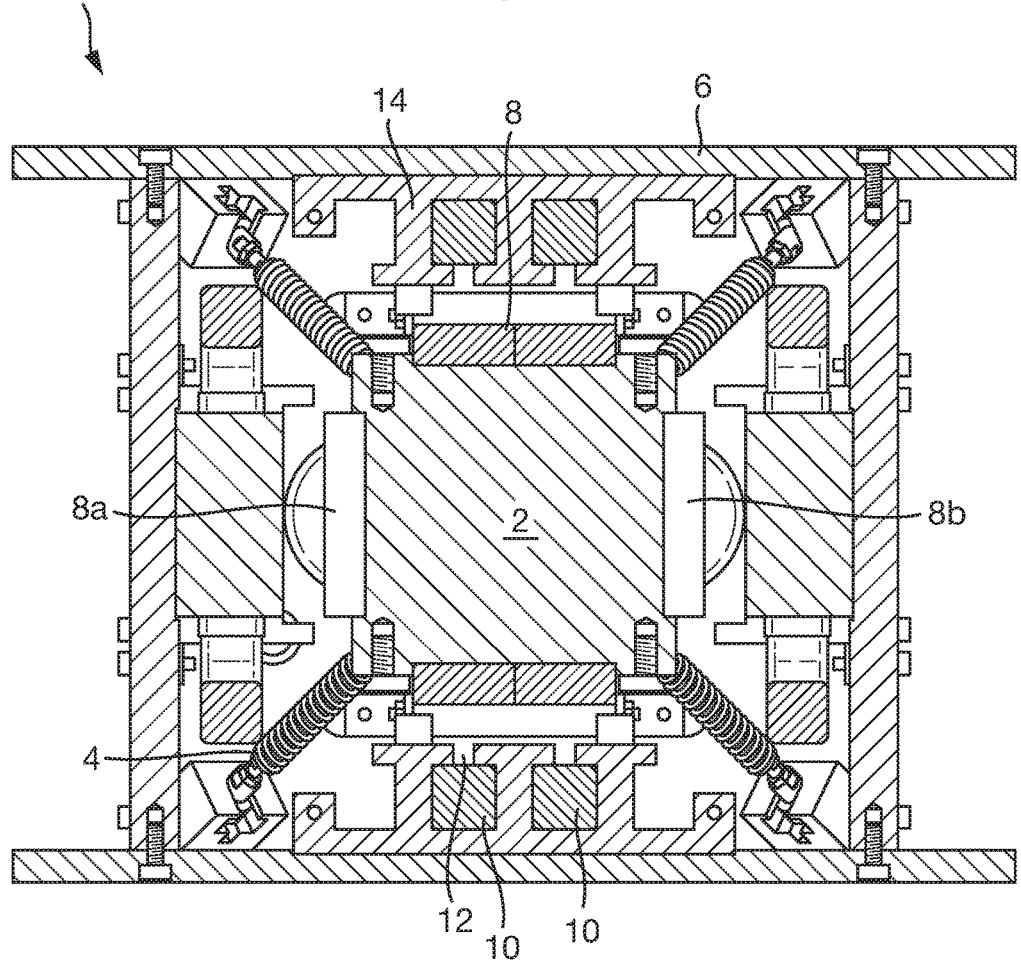
FIG. 2 shows a cross-sectional view of an actuator in accordance with the first embodiment.
Figure 3A:
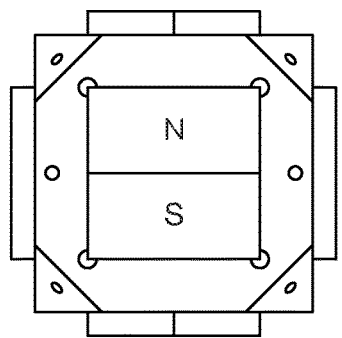
FIG. 3 (a) to FIG. 3(f) show the orientation of the magnets on the front, back, left, right, top and bottom faces respectively of the proof-mass of an actuator in accordance with the first embodiment.
Figure 3B:
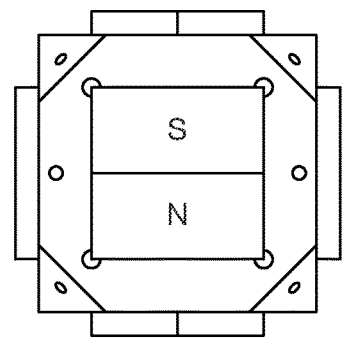
Figure 3C:
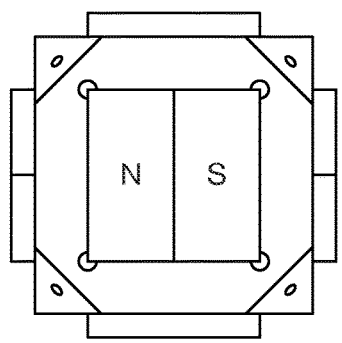
Figure 3D:
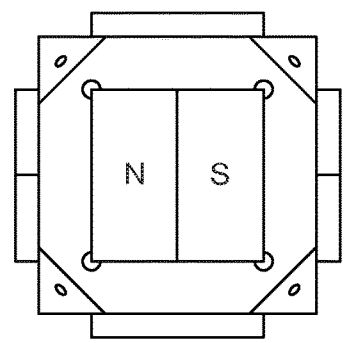
Figure 3E:
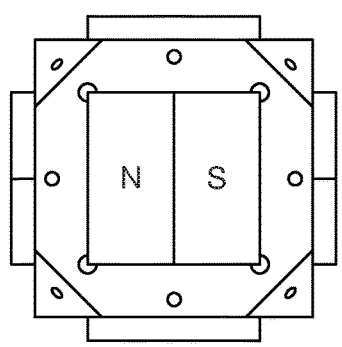
Figure 3F:
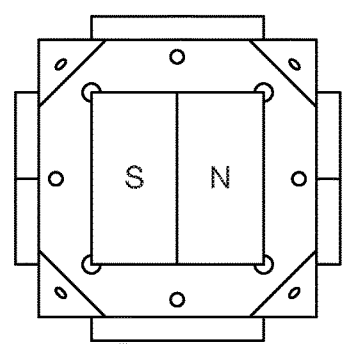

FIG. 2 shows a cross-sectional view of the actuator of the first embodiment. The cross-section of FIG. 2 is taken on a plane extending perpendicular to the longitudinal axis of two of the oblong coils 10.

FIG. 3 (a) to (f) shows the orientation of the magnets on the front, back, left, right, top and bottom faces of the proof-mass, respectively. Each magnet is rectangular when viewed in plan in FIG. 3 and has a substantially planar outer face that is either a North Pole face N or South Pole face S. FIG. 3 (a) shows the long side of each magnet is horizontal on the front face with the North Pole face N located above the South Pole face S. FIG. 3 (b) shows that on the back face the longitudinal axes of the magnets are in the orientation as on the front face, but the South Pole face S is located above the North Pole face N. The long side of each magnet of the left and right sides (see FIGS. 3 (c) and 3(d)) is vertical, while the long side of each magnet of the top and bottom faces runs from front to back (see FIGS. 3(e) and 3(f)). In this example, the magnets of all faces are arranged such that magnets having outer faces of differing polarity are located opposite each other on the cube (however, this is not necessary as the flux returns to the neighbouring magnet).

FIG. 4 shows a schematic cross-sectional view of second example actuator 101 in accordance with the present invention, wherein like numbers have been used to indicate like elements with respect to FIG. 1. This discussion will focus on those elements of the second embodiment which differ with respect to the first embodiment. In this example actuator 101 comprises a hollow steel cube 102. Six permanent magnets 108 are mounted on the inner surfaces 102a of the hollow cube 102. A lightweight support 116 is centrally located inside the cavity of the hollow cube 102. Six coils 110 are located on the lightweight support 116, each coil 110 being positioned opposite a corresponding magnet 108. A suspension system (not shown) extends between the inner surface 102a of the hollow steel cube 102 and the lightweight support 116 and biases the lightweight support 116 towards the central position as shown in FIG. 4.

In use, current flowing through the coils 110 in the presence of the magnet field of the corresponding pole pair 108 will generate a force that is transmitted to the proof-mass 102 via the magnets 108. In certain operating environments it may be advantageous to have the coils 108 and magnets 110 located within the cube 102 to protect them from damage during use. (In that case, the cube will not be made of steel, but the magnets will need a steel backing to allow an easy flux return path. Hence, looking at a cross section of say the right hand side magnet from left to right, there will be: a steel layer, magnet layer and then the wall of a non-magnetic cube, an air gap and coils in their laminated steel cores.)

Figure 5:
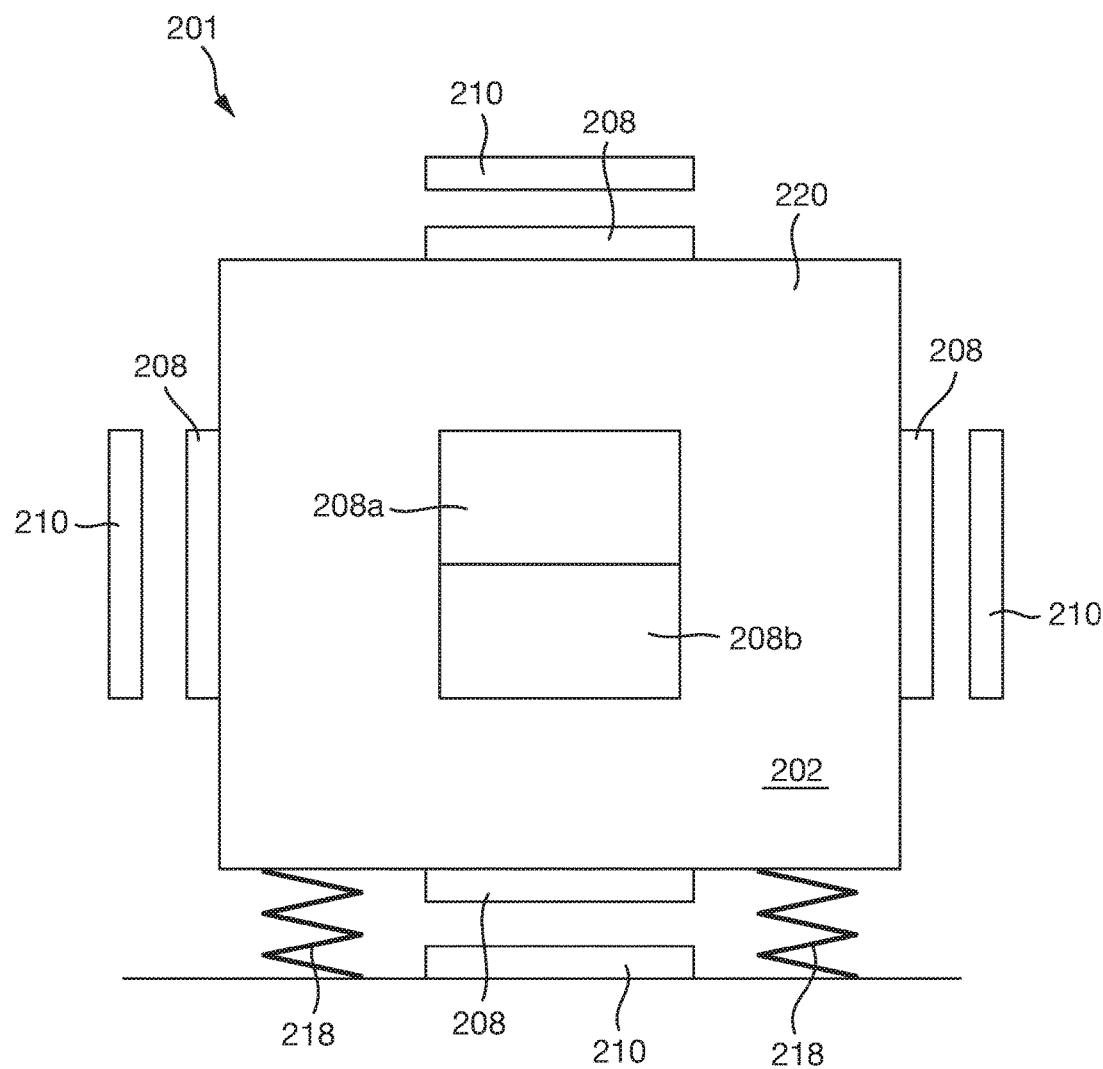
FIG. 5 shows a schematic view of an actuator according to a third embodiment of the invention.

FIG. 5 shows a schematic view of a third example actuator in accordance with the present invention. Again, like numbers have been used to indicate like elements. This discussion will focus on those elements of the third embodiment which differ with respect to the first embodiment. In this example, the steel cube 2 of the first example has been replaced by the housing 202 of a piece of machinery 220. The machinery 220 is spring mounted on a suspension system denoted by springs 218. Pole pairs 208 are attached to the outer surfaces of the housing 202. Located opposite each pole pair is a coil 210 supported by a coil-support framework (not shown). For clarity the front-side coil has not been included in FIG. 5.

In use, current flowing in the coils 210 can be used to produce a force on the housing 202 via the magnets 208 and thereby control the vibration of the machinery 220. Using the housing 202 of the machinery to be damped 220 as a proof-mass may reduce the additional space needed for the actuator 201 as well as reducing manufacturing costs by reducing the number of components.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It will be appreciated that it is not necessary for the actuator to provide motion in all six degrees of freedom. For example, in certain applications it may be more appropriate for the actuator to provide motion in two, three, four or five degrees of freedom.

It will be appreciated that the proof-mass may be rigidly connected to the magnets and mounted for movement relative to the coils (as described in FIG. 1 above) or vice versa.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A vibration damping apparatus comprising:
a cuboidal support frame; and
an actuator including a proof-mass coupled to the cuboidal support frame for movement in six degrees of freedom, wherein at least one of the six degrees of freedom is a translational degree of freedom;

six permanent magnet pole pairs attached to a surface of the proof-mass or to a surface of the cuboidal support frame; and six coils each positioned opposite a corresponding one of the six permanent magnet pole pairs, each coil being associated with one of the magnet pole pairs such that a current flowing through the respective coil in the presence of a magnetic field of the respective pole pair induces a force that acts on the proof-mass.

2. The vibration damping apparatus according to claim 1, wherein the coils are arranged such that a current flowing through the coils produces forces that act radially with respect to a face of the proof-mass, tangentially with respect to the face of the proof-mass, or both radially and tangentially with respect to the face of the proof-mass.

3. The vibration damping apparatus according to claim 1, wherein the proof-mass is cuboidal, and wherein the coils induce forces that act on each face of the cuboidal proof-mass.

4. The vibration damping apparatus according to claim 1, wherein the proof-mass is located within a volume defined by the coils.

5. The vibration damping apparatus according to claim 1, further comprising a a plurality of resilient members, each of the resilient members coupled to the proof-mass and biased to return the proof-mass to a central configuration within the cuboidal support frame.

6. The vibration damping apparatus according to claim 5, wherein the resilient members include coil springs.

7. The vibration damping apparatus according to claim 6, wherein the proof-mass is cuboidal, and wherein each of the coil springs is located at each vertex of the cuboidal proof-mass.

8. The vibration damping apparatus according to claim 1, further comprising a control system configured to control the current flowing through the coils.

9. The vibration damping apparatus according to claim 8, wherein the control system comprises one or more sensors arranged to detect a location of the proof-mass within the cuboidal support frame.

10. The vibration damping apparatus in accordance with claim 1, further comprising a structure coupled to the cuboidal support frame, wherein the actuator is configured to exert a force on the structure to reduce vibration of the structure.

11. The actuator according to claim 1, further comprising a suspension system biased to return the proof-mass to a central configuration.

12. The vibration damping apparatus according to claim 1, wherein the cuboidal support frame includes at least two parallel slots, and wherein at least two sides of the coils are located in the at least two parallel slots.

13. The vibration damping apparatus according to claim 1, wherein each of the pole pairs is centrally located on, and extends over, each surface of the proof-mass.

14. The vibration damping apparatus according to claim 13, wherein one of the magnets in each pole pair is orientated with its south pole facing outwards from the surface of the proof-mass and the other one of the magnets in the same pole pair is orientated with its north pole facing outwards from the surface of the proof-mass.

15. The vibration damping apparatus according to claim 14, wherein the magnets in one of the pole pairs are located opposite the magnets in another one of the pole pairs, and wherein the oppositely located magnets have differing polarity.

16. A method of damping vibration in a structure, using a cuboidal support frame and an actuator including a proof-mass coupled to the cuboidal support frame for movement in six degrees of freedom, wherein at least one of the six degrees of freedom is a translational degree of freedom, six permanent magnet pole pairs attached to a surface of the proof-mass or to a surface of the cuboidal support frame, and six coils each positioned opposite a corresponding one of the six permanent magnet pole pairs, each coil being associated with a magnet such that current flowing through the coil in the presence of the magnetic field of the pole pair induces a force that acts on the proof-mass, the proof-mass being mounted for movement in six degrees of freedom, the method comprising:

causing a current to flow through at least two of the coils to produce translation of the proof-mass in a first degree of freedom; and causing a current to flow through at least one of the coils to produce movement of the proof-mass in a second degree of freedom.

17. A generator comprising:
a cuboidal support frame; and
a generator unit including
a proof-mass coupled to the cuboidal support frame for movement in six degrees of freedom, wherein at least one of the six degrees of freedom is a translational degree of freedom;

six permanent magnet pole pairs attached to a surface of the proof-mass or to a surface of the cuboidal support frame; and six coils each positioned opposite a corresponding one of the six permanent magnet pole pairs, each coil being associated with a magnet such that movement of the proof-mass induces a current to flow through the respective coil.

18. The generator according to claim 17, wherein the proof-mass is cuboidal, and wherein the coils induce forces that act on each face of the cuboidal proof-mass.

* * * * *